R. E. DIXON.
AUTOMATIC BRAKE.
APPLICATION FILED DEC. 7, 1920.
1,386,242.
Patented Aug. 2, 1921.
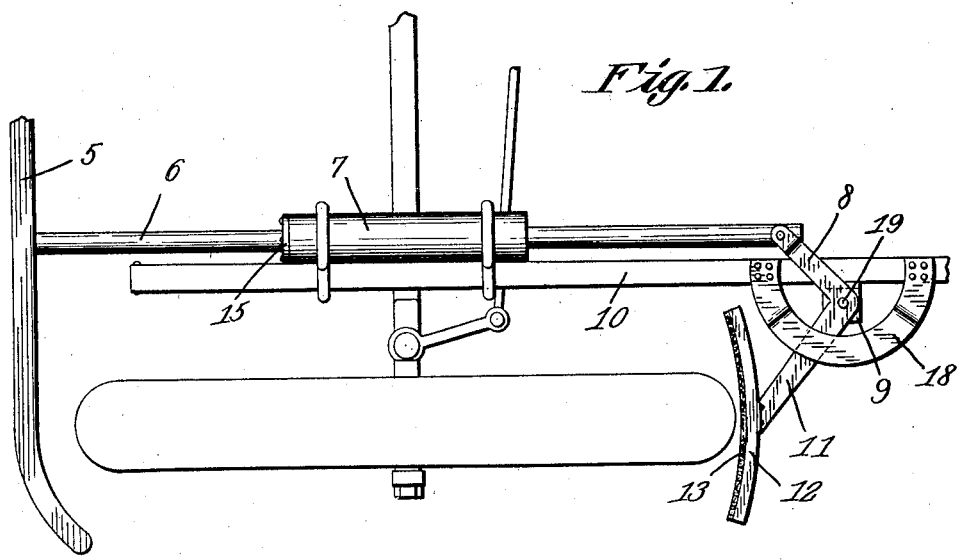
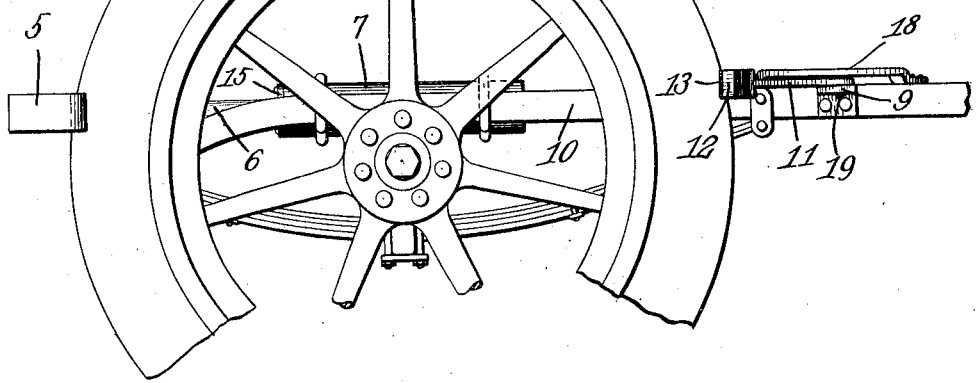
Inventor,
R. E. Dixon.
By C. A. Snow & Co.
Attorneys

UNITED STATES PATENT OFFICE.

ROBERT E. DIXON, OF ST. LOUIS, MISSOURI.

AUTOMATIC BRAKE.

1,386,242.    Specification of Letters Patent.    Patented Aug. 2, 1921.

Application filed December 7, 1920. Serial No. 428,957.

*To all whom it may concern:*

Be it known that I, ROBERT E. DIXON, a citizen of the United States, residing at St. Louis, in the county of St. Louis City and State of Missouri, have invented a new and useful Automatic Brake, of which the following is a specification.

This invention relates to brakes, and more particularly to a novel form of brake to be employed in connection with motor vehicles, it being the primary object of the invention to provide a brake associated with a bumper, whereby movement of the bumper will cause the operation of the brake to retard the movement of the motor vehicle, to which the same is applied.

A further object of the invention is to provide a device of this character including a plunger having direct connection with the bumper, the plunger having pivotal connection with the brake shoe to move the brake shoe simultaneously with the bumper, when the bumper meets with an obstruction.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a fragmental plan view showing a brake constructed in accordance with the present invention as applied to an automobile chassis.

Fig. 2 is a side elevational view of the same, the wheel being partly broken away.

Fig. 3 is a longitudinal sectional view through the plunger casing.

Referring to the drawing in detail, the device is shown as employed in combination with a bumper which is of the usual construction and indicated by the reference character 5, to which bumper is secured a brake operating rod or plunger 6, which extends through the tubular casing 7 that is supported in any suitable manner adjacent to the front axle of an automobile.

As shown, this operating rod extends to a point an appreciable distance beyond the rear end of the casing 7, where the same has pivotal connection with the arm 8 of the bell crank lever, the bell crank lever being pivotally supported by the bracket 9 which has connection with the side rail 10 of the chassis of the vehicle.

A relatively long arm 11 forms a part of the bell crank lever, and has a brake shoe 12 mounted on one end thereof, which brake shoe is curved and provided with a wear surface 13 which is formed of rubber, leather or other suitable material to contact with the tire of the motor vehicle, and accomplish the braking thereof, with a minimum amount of wear directed to the tire of the vehicle.

Supported on the actuating rod 6 is a collar 14 which is connected with the rod in a manner to move therewith, the collar, in its normal position abutting against the removable end member 15, to restrict movement of the rod 6 in one direction.

Positioned within the casing 7 and surrounding a portion of the rod 6, is a coiled spring 16 which has one end thereof abutting the inner surface of the end 17 of the casing, while the opposite end thereof contacts with the collar 14 to normally urge the rod 6 to the limit of its forward motion.

Secured to the side rail 10 of the chassis, and disposed at a point above the arm of the bell crank lever, is an arcuate-shaped guard member 18 which is designed to contact with the upper surface of the arm 11, in the event that the motor vehicle is moving rapidly at the time of the application of the brake, whereby the arm 11 is held in its normal position and prevented from moving upwardly, thereby relieving the pivot pin 19, which connects the bell crank lever to the bracket 9, of the severe strain which would be ordinarily directed thereto.

In the operation of the device, it is obvious that as the bumper 5 is moved rearwardly, due to its contact with an obstruction, the arm 8 of the bell crank lever is moved rearwardly by the action of the actuating rod 6, which movement results in a relative forward movement of the arm 11. It follows that the brake shoe 12 is now moved into engagement with the tread of the tire to stop rotation of the wheel supporting the same.

As soon as the rearward pressure on the bumper 5 has been relieved, the spring 16 operates to disengage the brake shoe 12, and the tire, whereupon the brake is in a position to be again operated by a rearward movement of the actuating rod.

While I have shown and described the operation of a brake, at one side of a vehicle, it is obvious that this structure is to be duplicated on both front wheels of the vehicle.

Having thus described the invention, what is claimed as new is:—

In combination with the front wheels and bumper of a motor vehicle, a brake including a bell crank lever, a brake shoe carried by the bell crank lever, a rod connecting the bell crank lever and bumper, whereby movement of the rod in one direction forces the brake into engagement with the wheel, means for normally holding the brake out of contact with the wheel, and a guard disposed above the bell crank lever to restrict vertical movement of the brake.

In testimony that I claim the foregoing as my own, I have hereto affixed my signature in the presence of two witnesses.

ROBERT E. DIXON.

Witnesses:
JAS. N. PATRICK,
CHAS. L. DELCOMMUNE.